TRANSMITTER FOR STEREOPHONIC INFORMATION SIGNALS

Filed Feb. 12, 1959 4 Sheets-Sheet 1

INVENTORS
ROBERT C. MOORE
EDGAR M. CREAMER, JR.
HAROLD B. COLLINS, JR.
BY
Robert D. Sanborn
ATTORNEY

TRANSMITTER FOR STEREOPHONIC INFORMATION SIGNALS

Filed Feb. 12, 1959 4 Sheets-Sheet 2

INVENTORS
ROBERT C. MOORE
EDGAR M. CREAMER, JR.
HAROLD B. COLLINS, JR.
BY Robert D. Sanborn
ATTORNEY INVENTORS
ROBERT C. MOORE
EDGAR M. CREAMER, JR.
HAROLD B. COLLINS, JR.
BY
Robert D. Sanborn
ATTORNEY

TRANSMITTER FOR STEREOPHONIC INFORMATION SIGNALS

Filed Feb. 12, 1959 4 Sheets-Sheet 4

INVENTORS
ROBERT C. MOORE
EDGAR M. CREAMER, JR.
HAROLD B. COLLINS, JR.
BY Robert D. Sanborn
ATTORNEY United States Patent Office 3,007,005
Patented Oct. 31, 1961

3,007,005
TRANSMITTER FOR STEREOPHONIC INFORMATION SIGNALS

Robert C. Moore, Huntingdon Valley, Edgar M. Creamer, Jr., Melrose Park, and Harold B. Collins, Jr., Wayne, Pa., assignors to Philco Corporation, Philadelphia, Pa., a corporation of Pennsylvania Filed Feb. 12, 1959, Ser. No. 792,750
13 Claims. (Cl. 179—15)

The present invention relates to stereophonic broadcasting systems and more particularly to transmitter means for single channel amplitude modulation stereophonic signals.

The stereophonic reproduction at a distance of any program requires that the sound be picked up at two or more spaced points at the originating location and supplied to two or more spaced reproducers at the distant location. In order to preserve the stereophonic effect it is necessary to provide the equivalent of two separate signal channels from the transmitting location to the point of reception. In the interest of economy and because the available radio frequency spectrum is limited it is desirable that the necessary signal channels be provided by existing radio broadcasting systems within their allotted frequency bands. Further in the interest of economy and to insure complete compatibility with existing monaural receivers now in use for receiving monaural program signals from these receivers it is desirable that the equivalent of the two separate signal channels be supplied by a single radio channel and that the combined signals on this channel be receivable as a complete monaural program signal by the monaural receivers.

Completely workable systems for amplitude modulation radio systems have been proposed in which the station carrier frequency signal is modulated in one phase by one stereophonic program signal and in a quadrature phase by the second stereophonic program signal. The signal thus produced is readily accommodated within the frequency limits assigned to one amplitude modulation radio station and monaural receivers respond to the stereophonic program signals in approximately the same manner in which they would respond to a monaural signal having a modulating signal equivalent to the algebraic sum of the two stereophonic program signals.

In the past it has been proposed that the desired phase relationship between the modulating components be achieved by modulating one stereophonic program signal on a carrier wave which is at a first phase, modulating the second stereophonic program signal on a carrier wave which is in quadrature phase with the first carrier and then adding the modulated carrier signals to provide a single resultant carrier wave with the desired quadrature phase modulation components. This approach has several disadvantages. In many existing radio stations the modulator operates at a power level of several hundred to several thousand watts. If quadrature modulation of the carrier is to be accomplished a second modulator of like power capacity is required. In addition, a radio frequency adder circuit is required which will handle the power output of both modulators. High power modulator circuits of this type are expensive to install and expensive to operate. Furthermore, modulators in existing radio stations vary widely in their characteristics. Therefore each conversion unit for existing radio transmitters must be custom designed for the particular radio station to be converted from monaural broadcasting to stereophonic broadcasting.

It is an object of the present invention to provide an improved system for transmitting two stereophonic program signals over a single amplitude modulation radio channel.

A further object of the present invention is to provide a system for transmitting two stereophonic program signals over a single amplitude modulation channel, which system may be incorporated in existing radio transmitting stations with minimum modification of existing circuitry.

An additional object is to provide a low power system for producing the full equivalent of quadrature phase modulation of a radio frequency carrier signal.

Still another object of the present invention is to provide a universal stereophonic adapter unit which may be applied with a minimum amount of modification to different types of amplitude modulation radio stations.

In general, these and other objects of the present invention are achieved by a system in which a signal which includes one component representative of the difference of the two stereophonic signals and at least one component which is an exponential function of one of the stereophonic program signals is employed to phase modulate the assigned carrier frequency wave and in which a second signal representative principally of the sum of said two stereophonic program signals is employed to amplitude modulate said phase modulated carrier frequency wave.

For a better understanding of the present invention together with other and further objects thereof reference should now be made to the following detailed description which is to be read in conjunction with the accompanying drawings in which.

Figure 1:
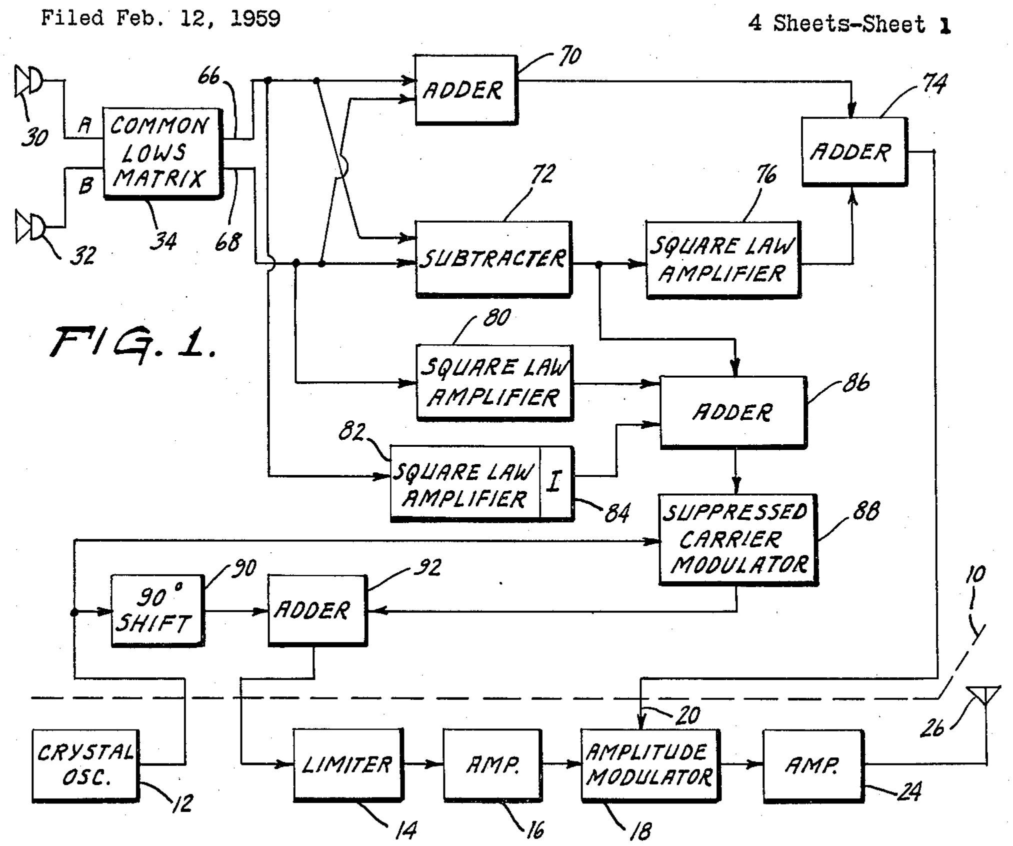
FIG. 1 is a block diagram of one preferred embodiment of the present invention.

In FIG. 1 the portion of the system below the broken line 10 represents the circuit components which are usually present in a conventional monaural radio transmitter. The portion of the system above the broken line 10 represents the additional circuitry required for converting the monaural transmitter for stereophonic broadcasting. As will be explained in more detail later the additional circuitry shown may be manufactured as a universal adapter kit which plugs into, or connects easily to, most commercial amplitude modulation transmitters. Furthermore, the entire system of FIG. 1 provides a very economical means for the stereophonic transmission of two signals. Therefore it is equally feasible to construct an entire transmitter station solely for stereophonic broadcasting in accordance with the embodiment of FIG. 1. Monaural transmission of a program signal is possible merely by tying together the two audio input channels or by inactivating certain components of the system of FIG. 1.

As shown in FIG. 1, the monaural transmitter portion of the system comprises an oscillator circuit 12 for generating a carrier wave at the carrier frequency assigned to the radio station. This oscillator 12 is shown in FIG. 1 as a crystal oscillator but other forms of stable oscillators may be employed. In many commercial transmitters the oscillator 12 is connected directly to the input of a limiter 14. However for reasons which will appear presently this connection is broken in the system of FIG. 1. The carrier wave from oscillator 12, or from the stereophonic circuits which will be described presently, is passed through limiter 14 and an amplifier 16 to the carrier wave input of an amplitude modulator 18. Modulator 18 is also provided with a program or modulating signal input 20. The modulated output signal of modulator 18 is passed through a power amplifier 24 to the station antenna 26. Obviously commerical radio transmitters will vary in the number of amplifiers, etc. provided and in placement of these components in the circuit. However, the arrangement shown in FIG. 1 is typical and in sufficient detail to permit anyone skilled in the art to apply the principles of the present invention to any commercial broadcasting transmitter now in operation.

Attention will now be directed to that portion of the present invention which lies above the broken line 10 of FIG. 1. The means for initially generating the two stereophonic program signals is not part of the invention per se. However, by way of illustration, FIG. 1 shows two microphones 30 and 32 which supply two stereophonically related signals to a signal matrix 34. Matrix 34 combines the two stereophonic information signals supplied by microphones 30 and 32 in such a manner that the low frequency components of both input signals and the high frequency components of one input signal appear at one output of matrix 34 and the low frequency components of both input signals and the high frequency components of the other input signal appear at the other output of matrix 34. It is the practice in the stereophonic art to refer to one stereophonic program signal as the A signal and the other stereophonic program signal as the B signal. This convention will be followed in this specification. It has been found in practice that frequencies in the low audio range, say below 300 to 500 cycles, contribute little to the over-all subjective stereophonic effect at the receiving location. It has been discovered also that, if the same low frequency components are present on each channel of the stereophonic system, the low frequency components disappear entirely from circuits handling only the difference of the A and B signals. This relaxes the bandwidth and filtering requirements of such circuits with a resultant simplification in design and saving in production costs.

Figure 2:
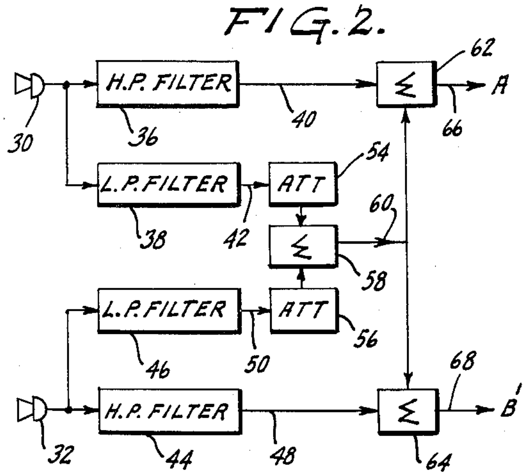
FIG. 2 is a detailed block diagram of a signal matrix included in the embodiment of FIG. 1.

FIG. 2 is a detailed block diagram of a signal matrix system for equalizing the low frequency components in the two channels. The signal from microphone 30 is supplied to the input of a high pass filter 36 and a low pass filter 38. Filters 36 and 38 preferably have approximately the same cut-off frequency so that together they form a crossover network which supplies the higher frequency components of the signal supplied by microphone 30 to the output lead 40 and the lower frequency components of the signal to the output lead 42. The roll-off characteristics of the filters 36 and 38 should be complementary so that the matrix has a smooth frequency vs. output characteristic for the same signal as the two inputs 30 and 32. Similarly, the signal from microphone 32 is supplied to a crossover network comprising high pass filter 44 and low pass filter 46. Again the characteristics of filters 44 and 46 should be complementary. The higher frequency components of the signal from microphone 32 will appear on output lead 48 of filter 44 and the lower frequency components will appear on output lead 50 of filter 46. The lower frequency components present on leads 42 and 50 are supplied through attenuators 54 and 56 to the two inputs of an adder circuit 58. The function of attenuators 54 and 56 is to reduce the amplitude of the signals passed therethrough by one-half so that the combined signal at output connection 60 of adder 58 will have a peak amplitude which does not exceed the peak amplitudes of the lower frequency components of the signal supplied by microphones 30 and 32. The common low frequency components present on output connection 60 of adder 58 are supplied to one input each of a pair of adder circuits 62 and 64. Output connection 40 of filter 36 and output connection 48 of filter 44 provide the second inputs to adder circuits 62 and 64, respectively. It will now be apparent that the combined signal at output 66 of adder 62 comprises the higher frequency components of the signal supplied by microphone 30 and the common lower frequency components of the signal supplied by microphones 30 and 32. In the description that follows this signal will be referred to as the A' signal. Similarly, the signal appearing at output connection 68 of adder 64 includes the higher frequency components of the signal supplied by microphone 32 and the combined lower frequency components of the signal supplied by microphones 30 and 32. This signal is hereinafter referred to as the B' signal.

The detail block diagram of FIG. 2 is included solely to illustrate the functioning of the signal matrix circuit 34. It will be understood that in an actual circuit two or more of the functions performed by separate blocks in FIG. 2 may be performed by a single circuit. For example the impedances of the input circuit of adder 58 may be selected so as to perform the attenuation function represented by blocks 54 and 56. Other means for combining the low frequency components of two signals are also known in the art. For example, in systems such as the one shown in FIG. 1 which include a subtracter the same result can be achieved by eliminating the matrix 34 and inserting a high pass filter (not shown) following subtracter 72. The lower cut-off of this filter may be of the order of 300–500 cycles per second. Therefore the invention is not to be limited in any way by the block diagram of FIG. 2.

Turning once again to FIG. 1 it will be seen that the two output leads 66 and 68 of matrix 34 are supplied to two inputs of an adder circuit 70 and also to two inputs of a subtracter circuit 72. Subtracter circuit 72 may be an adder circuit with means for inverting one of the input signals supplied to the adder means. The output signal of adder circuit 70 is supplied to one input of a second adder circuit 74. The output of subtracter circuit 72 is passed through a square law amplifier 76 to a second input of adder circuit 74. The output of adder 74 is supplied to signal input 20 of modulator 18. Square law amplifier 76 is a circuit which provides an output signal having an amplitude which is proportional to the square of the amplitude of the input signal. Examples of square law amplifiers of this type are shown in Waveforms, volume 19, Radiation Laboratory Series, McGraw-Hill Book Company, Inc., 1949, section 19.7.

The A' signal present on output leads 66 and 68 of matrix 34 are also supplied to the inputs of square law amplifiers 82 and 80, respectively. Amplifiers 80 and 82 have generally the same input vs. output characteristic as square law amplifier 76 described above. However, amplifier 82 differs from amplifiers 76 and 80 in that it includes means 84 for reversing the polarity of the output signal. This means 84 may comprise an inverter stage in the output circuit of amplifier 82. The output signals provided by amplifiers 80 and 82, respectively, are supplied to two inputs of an adder circuit 86. Adder circuit 86 receives a third input signal from the output of subtracter 72.

A suppressed carrier modulator 88, a 90° phase shift circuit 90 and an adder circuit 92 together form means for phase modulating the carrier wave supplied by oscillator 12. To accomplish this phase modulation the output of oscillator 12 is connected through phase shifter 90 to one input of adder circuit 92. The output of modulator 88 is connected to a second input of adder circuit 92. The output wave of oscillator 12 is also supplied as the carrier input wave to suppressed carrier modulator 88. The output of adder circuit 86 is connected to the modulating signal input of modulator 88. The output of adder 92 is connected to the input of limiter 14.

The system shown in FIG. 1 operates as follows. Subtracter 72 provides a signal which is proportional to the difference between the A′ signal and B′ signal present on leads 66 and 68, respectively. This difference signal is supplied to one input of adder circuit 86. Amplifier 80 provides an output signal which is proportional to $(B')^2$. Amplifier 82 and inverter 84 together provide a signal which is proportional to $-(A')^2$. Adder circuit 86 combines the signals from subtracter 72, amplifier 80 and amplifier-inverter 82—84 and provides at its output a signal, the instantaneous amplitude of which is represented by the equation:

$$S_p = C_1(A'-B') - C_2(A')^2 + C_3(B')^2 \quad (1)$$

where $C_1$, $C_2$ and $C_3$ are constants having approximately the values ½, ¼ and ¼, respectively, if the amplitude of the signal supplied by phase shift circuit 90 to adder 92 is taken as unity amplitude. The proper ratio between the $(A'-B')$ component and the $-(A')^2$ and the $(B')^2$ components may be provided by suitable ratio circuits in the output circuits of subtracter 72 and amplifiers 80 and 82 and/or in the input circuits of adder 86.

The audio frequency signal at the output of adder 86 represented by Equation 1 is supplied to modulator circuit 88 to amplitude modulate the radio frequency signal supplied to this modulator 88 from oscillator 12. The output signal of modulator 88 is a radio frequency signal which has a phase determined by the phase of the signal supplied by oscillator 12 and an amplitude as given by Equation 1 above. In measuring the A′ and B′ components in the output of modulator 88 the amplitude of the carrier signal supplied by phase shift circuit 90 to adder circuit 92 is taken to be unity.

Figure 1A:
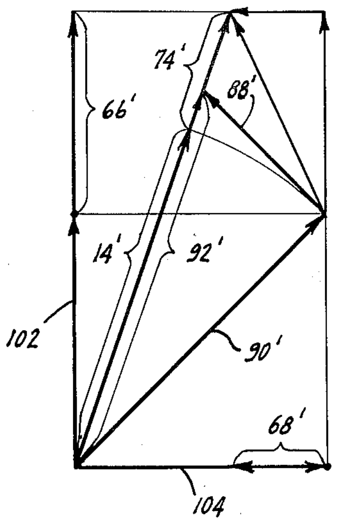
FIG. 1A is a vector diagram illustrative of the phase and amplitude relationships of certain signals in the system of FIG. 1.

The addition of the amplitude modulated radio frequency signal derived from modulator 88 to the quadrature phased unmodulated carrier wave supplied by phase shift circuit 90 results in a signal at the output of adder circuit 92 which is modulated in phase by an amount which is approximately proportional to the amplitude of the signal supplied by adder 88. This relationship is best illustrated by the vector diagram of FIG. 1A. In FIG. 1A vector 66′ represents the instantaneous amplitude of the A′ signal present on output lead 66 of matrix 34. Similarly vector 68′ represents the instantaneous amplitude of the B′ signal which is present on output lead 68 of FIG. 1. Vector 90′ represents the unity amplitude carrier wave supplied by phase shift circuit 90 to adder circuit 92. Vector 88′ represents the instantaneous amplitude of the amplitude modulated radio frequency signal supplied by modulator 88. The resultant vector 92′ represents the phase modulated signal appearing at the output of adder circuit 92. It should be understood that the vector 92′ will occupy the position shown only when the A′ and B′ signals have the instantaneous values represented by vectors 66′ and 68′ in FIG. 1A. As the A′ and B′ signals vary in amplitude the vector 92′ will vary back and forth about the reference position represented by vector 90′. The excursions on either side of the reference position will not be equal even if the A′ and B′ signals represent pure tone signals because of the squared terms which occur in Equation 1 which defines the length of vector 88′.

It can be seen from the vector diagram of FIG. 1A that the signal at the output of adder 92 has a small component of amplitude modulation in addition to the phase modulation. This amplitude modulation is removed by limiter 14 to produce a signal which may be represented by vector 14′. Vector 14 has a constant amplitude but varies in phase with vector 92′. Limiter 14, amplifier 16 and modulator 18 should have good phase linearity over the frequency range which is necessary to pass the phase modulated signal represented by vector 14′. In general, the bandwidth required on either side of the carrier frequency is approximately equal to the highest audio frequency component of the A′ and B′ signal that is to be transmitted.

The phase modulated radio frequency signal supplied to modulator 18 is amplitude modulated by the signal supplied by adder circuit 74. The output signal from adder circuit 74 is made up of two components, an $A'+B'$ component derived from adder circuit 70 and an $(A'-B')^2$ component derived from amplifier 76. The gain of the amplifier 76 and the constants of the coupling circuits between adder 70, adder 74 and amplifier 76 are so selected that the amplitude of the output signal from adder 74 is given by the expression:

$$S_A = K_1(A'+B') + K_2(A'-B')^2 \quad (2)$$

where $K_1$ and $K_2$ are constants having the values approximately ½ and approximately ¼ to ⅛, respectively, if the amplitude of the radio freqeuncy signal supplied to modulator 18 is taken as unity amplitude. If by suitable choice of scale factor, vector 14′ of FIG. 1A is now chosen to represent the amplitude of the constant amplitude, phase modulated carrier signal supplied to modulator 18, the amplitude modulation component of this vector given by Equation 2 is represented by vector 74′.

It can be seen from FIG. 1A that the phase and amplitude modulated signal at the output of modulator 18 which is represented by the combined vectors 14′ and 74′ is exactly equivalent to the signal which would be obtained by modulating the A′ signal represented by vector 66′ on a carrier wave represented by vector 102, modulating the B′ signal on a quadrature phased carrier wave represented by vector 104′ and then combining these two modulated carrier wave signals. However, as seen from FIG. 1, all of the circuits above the broken line 10 of FIG. 1 can operate at a power level of a few watts or less and can be employed with any existing amplitude modulation transmitter simply by breaking the connection between oscillator 12 and limiter 14 and by substituting the output of adder circuit 74 for the modulation signal normally supplied to input 20. The circuits shown above line 10 are less expensive to construct and operate than a modulator of the same power as modulator 18 plus an adder circuit capable of handling the combined power outputs of two such modulators. Since it is possible that certain radio transmitters now in use may not include limiters or circuits such as class B or class C amplifiers which function as limiters, it is desirable to include in circuits designed as universal stereophonic adapters for existing monaural radio transmitters one or more limiter stages (not shown) following adder 92.

It will be seen from FIG. 1 that inactivating either adder 86 or modulator 88 will result in the straight monaural transmission of an audio signal which may be represented as $A'+B'$ or $A+B$. Therefore it is not necessary to remove or modify any of the circuitry shown in FIG. 1 to accomplish the monaural transmission of program signals supplied to microphones 30 and 32. Monaural transmission may also be achieved by tying together the audio outputs of pickups 30 and 32 so that the A and B signals supplied to matrix 34 are always the same. This causes the output of subtracter 72 to be zero at all times. The output of square law amplifier 80 will exactly balance the output of square law amplifier 82 so that there will be no output signal from adder 86. Tying together the audio input leads is usually preferable to inactivating adder 86 or modulator 88 since it can be done at the program source rather than at the transmitter.

Figure 3:
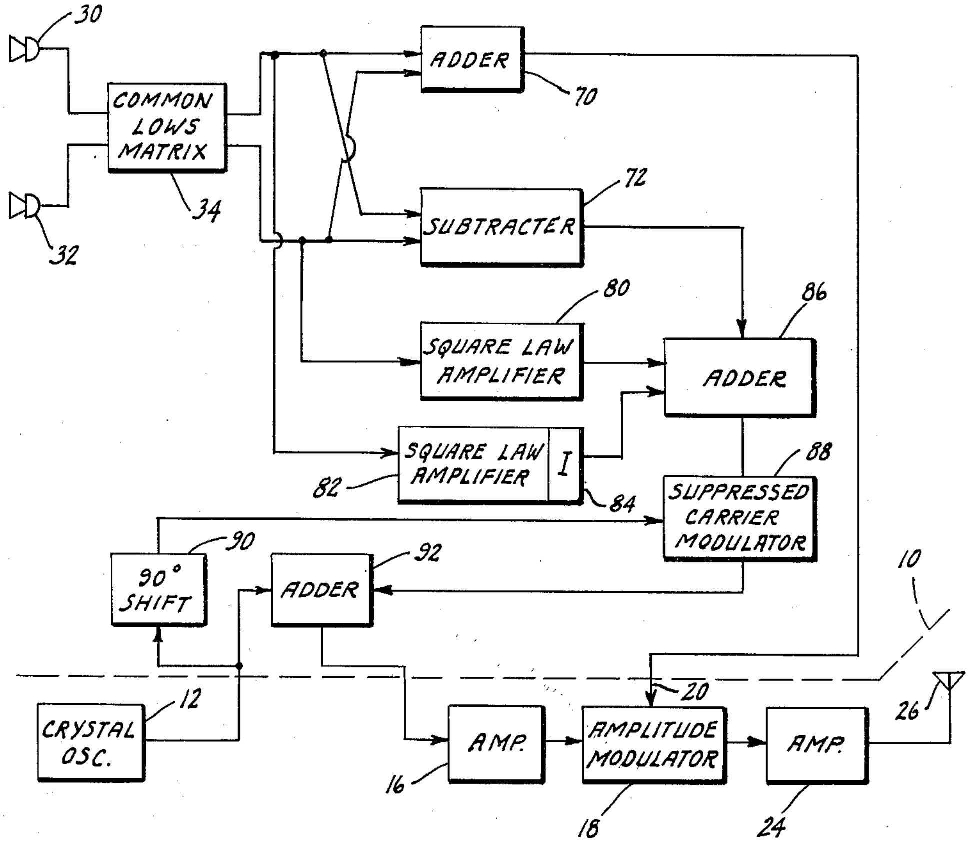
FIG. 3 is a block diagram of a second embodiment of the present invention which provides substantially the same signal at the output of the transmitter as the system of FIG. 1.
Figure 3A:
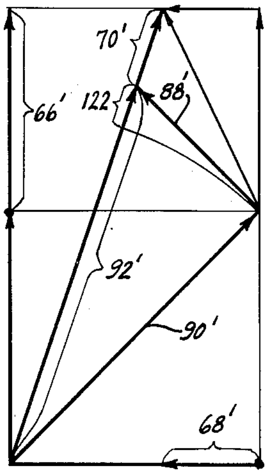
FIG. 3A is a vector diagram of certain signals present in the system of FIG. 3.
Figure 4:
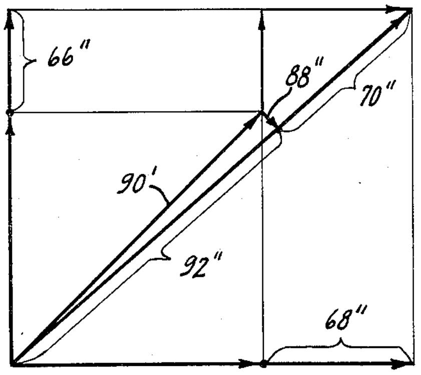
FIG. 4 is again a vector diagram showing the effect of a change in the stereophonic program signals on the signals present in the system of FIG. 3.

The circuit shown in FIG. 1 is based on the premise that amplifier 16 cannot accommodate amplitude variations in the signal passed therethrough. This may be due to the fact that this amplifier does not have a linear gain characteristic over the necessary range of signal amplitudes. In other instances the amplifier 16 may include circuits which limit on the peak amplitudes of the signal and thereby prevent the amplifier 16 from faithfully reproducing amplitude modulation present on the carrier signal supplied to the input thereof. If the amplifier 16 which precedes the modulator can accommodate amplitude modulation of the signal passed therethrough the simplified embodiment of the invention shown in FIG. 3 may be employed. The phase modulation portion of the circuit shown in FIG. 3 is identical to the phase modulation portion shown in the embodiment of the FIG. 1 with the sole exception that the output of adder 92 is supplied directly to the input of amplifier 16 rather than to the input of limiter 14. Parts in FIG. 3 corresponding to like parts in FIG. 1 have been identified by the same reference numeral. The effect of omitting the limiter 14 from the embodiment of FIG. 3 is to permit the amplitude modulation represented by component 122 to remain on the signal represented by vector 92'. It can be shown that the amplitude modulation represented by component 122 in FIG. 3A is equivalent to the amplitude modulation component provide by subtracter 72 and square law amplifier 76 in FIG. 1. Therefore the output of adder circuit 70 of FIG. 3 which corresponds to adder circuit 70 of FIG. 1 may be supplied directly to input 20 of amplitude modulator 18. This signal may be represented by the expression:

$$\tfrac{1}{2}(A'+B')$$

where the zero modulation amplitude of the carrier signal to amplitude modulator 18 is taken as the reference. This signal is represented in FIG. 3A by the vector 70'. The vector diagrams of FIGS. 1A and 3A assume the same values for the A' and B' signals and demonstrate that the signal present at the output of modulator 18 of FIGS. 1 and 3 is the same even though produced by different embodiments of the invention. The vector diagram of FIG. 4 illustrates the change in signal amplitudes which occur in the embodiment of FIG. 3 if the amplitudes of the A' and B' signals change to the values represented by the vectors 66'' and 68''. Since the value of the A' and B' signals are now more nearly equal, the amplitude of the signal from adder 88, which depends primarily on the difference between the A' and B' signals, will be reduced in amplitude as shown by vector 88''. As a result, vector 92'' will be more nearly in phase with vector 90'. The signal from adder 70, which depends solely on the sum of the A' and B' signals, will have a greater amplitude as shown by vector 70''.

Figure 5:
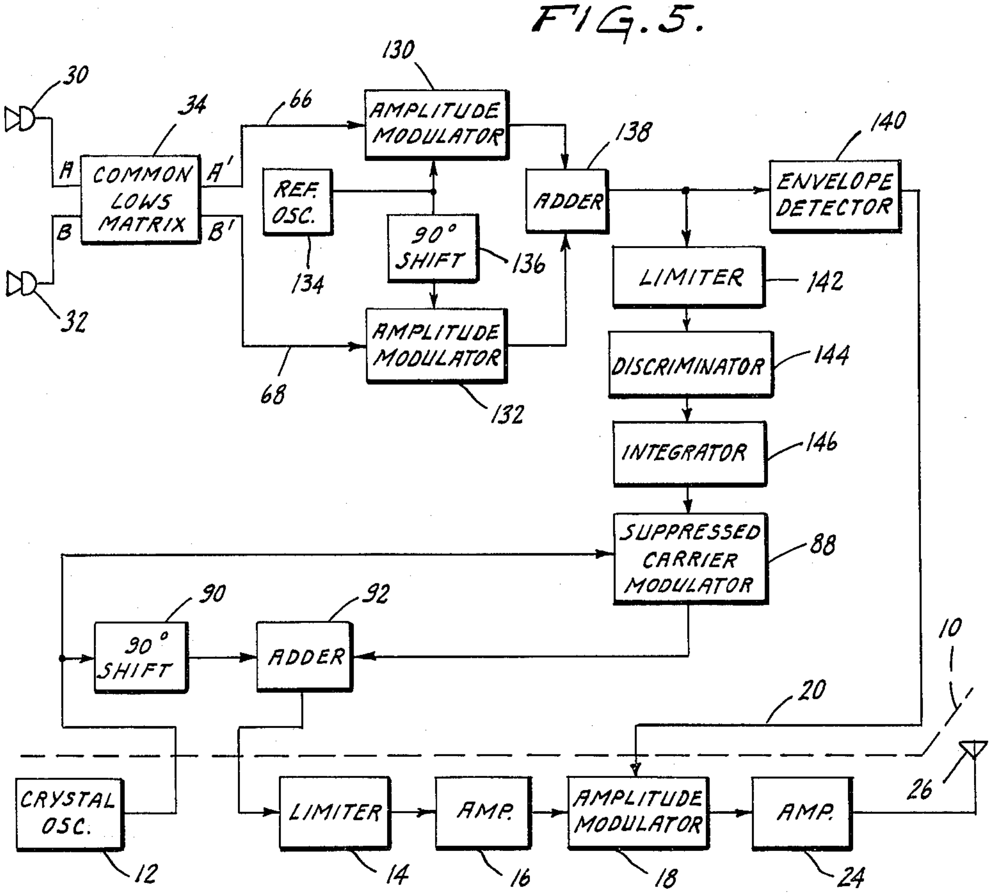
FIG. 5 is a block diagram of a third embodiment of the present invention.

FIG. 5 shows still another embodiment of the invention employing alternative means for generating the amplitude modulation and phase modulation signals from the A' and B' signals. The circuits below the broken line 10 in FIG. 5 correspond exactly to the circuits below line 10 of FIG. 1 and have been identified by the same reference numerals. The suppressed carrier modulator 88, phase shifter 90 and adder circuit 92 of FIG. 5 correspond to similarly numbered circuits in FIG. 1. Similarly, the means for generating the A' and B' signals are assumed to be the same as the circuit shown in FIG. 1. Output lead 66 of matrix 34 is connected to the input of an amplitude modulator 130 and output lead 68 is connected to the input of an amplitude modulator 132. Modulators 130 and 132 are supplied with quadrature phased carrier waves from a reference oscillator 134. Oscillator 134 may have any convenient frequency higher than twice the highest frequency component in the A' or B' signals. The output of oscillator 134 is supplied directly to the carrier wave input of modulator 130 and to the carrier wave input of modulator 132 through a 90° phase shifter 136. The outputs of modulators 130 and 132 are supplied to the two inputs of an adder circuit 138. The output of adder circuit 138 is connected to an envelope detector 140 and to a limiter circuit 142. Detector circuit 140 is connected directly to the input 20 of amplitude modulator 18. Limiter 142 is connected through a discriminator 144 and an integrator 146 to the modulation signal input of suppressed carrier modulator 88. Discriminator 144 has a crossover frequency equal to the frequency of the signal supplied by oscillator 134.

The operation of the embodiment of the invention shown in FIG. 5 will be explained with reference to the vector diagram of FIG. 1A. The output signal of modulator 130 is an amplitude modulated carrier signal which may be represented by the sum of the vectors 102 and 66' of FIG. 1A, where vector 102 represents the unmodulated carrier wave supplied by source 134. The output of modulator 132 may be represented by the sum of the vectors 104 and 68' in FIG. 1A. The quadrature displacement of vectors 102 and 104 is produced by the phase shifter 136 of FIG. 5. The output of adder circuit 138 is the vector sum of the signal supplied by modulator 130 and modulator 132. This signal is represented in FIG. 1A by the sum of vectors 14' and 74'. Since vector 14' represents the unmodulated carrier component, vector 74' again represents the amplitude modulation present on this carrier component. It is this amplitude modulation represented by vector 74' that is detected by envelope detector 140. Therefore the signal supplied by envelope detector 140 of FIG. 5 to amplitude modulator 18 corresponds exactly to the signal supplied by adder 74 of FIG. 1 to amplitude modulator 18 of FIG. 1.

The effect of limiter 142 is to remove the amplitude modulation component represented by vector 74'. Therefore the input to discriminator 144 will be the phase modulated signal represented by vector 14'. Discriminator 144 provides a signal which is proportional to the frequency variation of the output signal of limiter 142 as a function of time. This frequency modulation component extracted by discriminator 144 is integrated by circuit 146 to provide a signal proportional to the phase modulation of the signal present in the output of adder 138. This phase modulation component is approximately equal to the signal represented by the vector 88' in FIG. 1. Therefore the output signal of integrator 146 to suppressed carrier modulator 88 replaces the signals supplied to modulator 88 by added circuit 86 in FIG. 1.

Again the circuits shown in FIG. 5 may be low power circuits operating at a power level of a few watts or less. The characteristics of modulators 130 and 132 are preferably similar to each other but they are not required to be similar to modulator 18.

Figure 6:
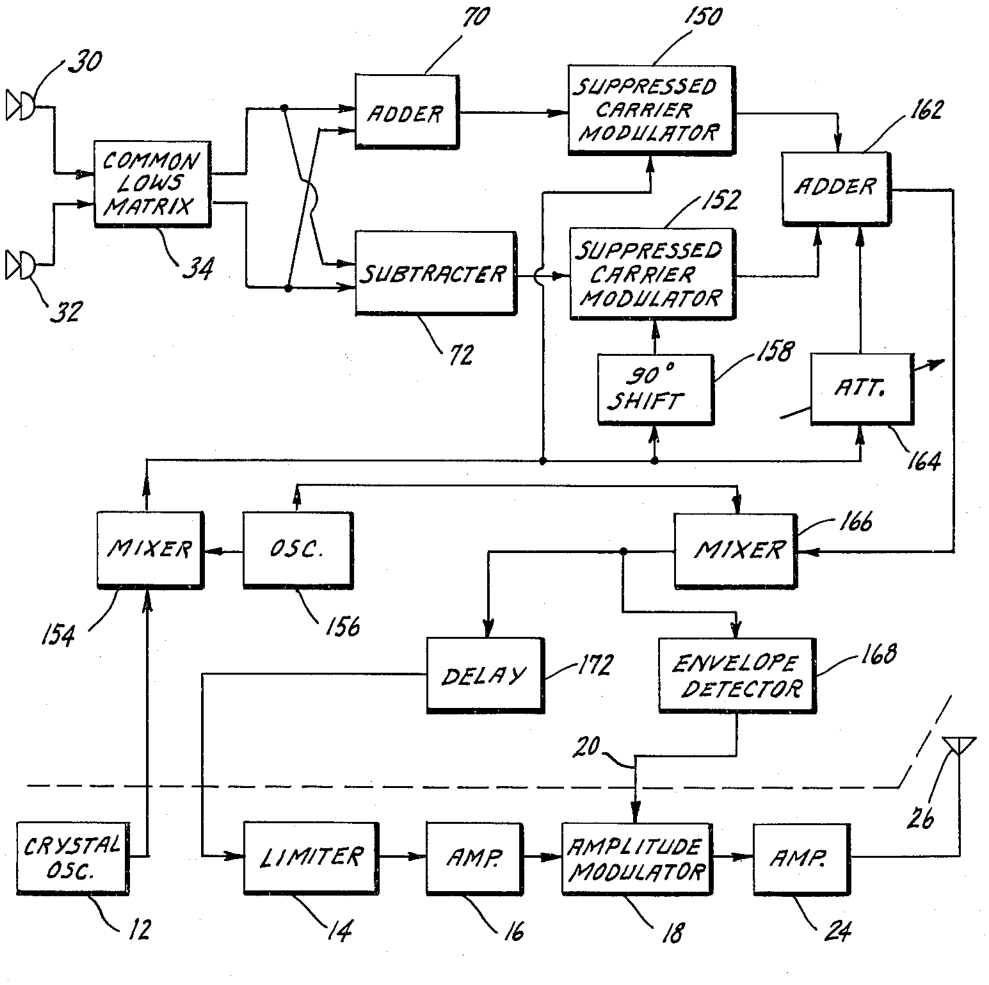
FIG. 6 is a block diagram of still another embodiment of the present invention.

FIG. 6 illustrates an embodiment of the invention which is similar in certain respects to the embodiment of FIG. 5. However, the embodiment shown in FIG. 6 produces the desired phase modulated signal to be supplied to limiter 18 without detecting the dual modulated carrier signal. Also the system of FIG. 6 differs from that of FIG. 5 in that in FIG. 6 it is the sum and difference signals $(A'+B')$ and $(A'-B')$ rather than the A' and B' signals that are modulated on a subcarrier. Turning now more specifically to FIG. 6 it will be seen that the $(A'+B')$ signal supplied by adder 70 is supplied to a suppressed carrier modulator 150. The $(A'-B')$ signal supplied by subtracter 72 is supplied to a second suppressed carrier modulator 152. Modulators 150 and 152 may be similar to modulator 88 of FIG. 1. A carrier frequency wave is supplied to modulator 150 from a mixer 154. The output of mixer 154 is supplied to modulator 152 through a 90° phase shifter 158. Mixer 154 receives one input wave from crystal oscillator 12 and a second input wave from an oscillator 156. The frequency of oscillator 156 is selected so that the carrier wave at the output of mixer 154 is at some convenient value, for example 300–400 kilocycles. As will appear later, slow variations in the frequency of oscillator 156 will not affect the frequency or phase of the carrier signal ultimately supplied to limiter 14 so that oscillator 156 may be any convenient form of oscillator circuit which has short term frequency stability.

The outputs of modulators 150 and 152 are connected to two inputs of an adder circuit 162. The carrier wave from mixer 54 is supplied to a third input of adder 162 through a variable attenuator 164. The composite output signal of adder 162 is supplied to one input of mixer 166. Mixer 166 receives a second signal directly from oscillator 156. The heterodyne sum signal from mixer 66 is supplied to an envelope detector 168 and to a delay device 172. The output of envelope detector 168 is connected directly to amplitude modulator 18. The output of the delay device 172 is connected to the input of limiter 14. As will be explained in more detail presently, the function of delay device 172 is to match the delays in the two signal paths from mixer 166 to modulator 18 so that the envelope of the phase modulation of the signal at the output of amplifier 16 will be in the proper time relationship with the corresponding amplitude modulation envelope at the output of envelope detector 168. If for some reason the envelope delay through the limiter 14 and amplifier 16 is greater than the envelope delay through envelope detector 168, a delay device (not shown) may be inserted between detector 168 and modulator 18 in place of, or in addition to, delay device 172.

The system shown in FIG. 6 operates in the following manner. The carrier wave from crystal oscillator 12 is heterodyned to a convenient frequency for the operation of modulators 150 and 152. As explained above this frequency may be of the order of 300–400 kilocycles. The sum signal from adder 70 is combined with the carrier wave from mixer 154 in suppressed carrier modulator 150 to produce a double sideband suppressed carrier signal which is supplied to one input of adder 162. The frequency of the suppressed carrier is equal to the chosen frequency of the output carrier wave of mixer 154. Similarly, the output signal from subtracter 72 is combined with a carrier wave from mixer 154 which has been shifted 90° in phase by phase shifter 158. The signal from modulator 152 is again a double sideband suppressed carrier signal about a carrier frequency equal to the frequency of the carrier wave supplied by mixer 154. The carrier frequency represented by the output wave of mixer 154 is reinserted by supplying a portion of this output wave to a third input of adder 162 through a variable attenuator 164. Thus the composite signal from adder 162 is a carrier wave which is modulated in amplitude by the $A'+B'$ signal supplied by adder 70 and in phase by the $A'-B'$ signal supplied by subtracter 72. The same output signal could be achieved by employing a conventional amplitude modulator in place of suppressed carrier modulator 150 and omitting the carrier reinsertion circuit. However, the arrangement shown in FIG. 6 permits modulators 150 and 152 to be substantially identical in their construction thus simplifying the manufacture and servicing of an actual embodiment of the invention. Furthermore, by adjusting the amplitude of the reinserted carrier wave by means of attenuator 164, any percentage of modulation may be obtained at the output of adder 162. Furthermore there is no possibility of losing the carrier wave from the composite output signal of adder 162 due to overmodulation in the sum channel.

The composite output signal of adder circuit 162 is supplied to one input of mixer 166. The function of mixer 166 is to reheterodyne the composite signal so that it has a carrier component exactly equal to the frequency of the carrier wave supplied by oscillator 12. It will be seen that since the same oscillator 156 is supplied to mixers 154 and 166, respectively, any frequency drift of oscillator 156 will not affect the frequency of the carrier wave component of the signal at the output of mixer 166. The signal at the output of mixer 166 is in the proper form for transmission from antenna 26 and, in a system built primarily for stereophonic broadcasting, this signal from mixer 166 may be supplied through appropriate power amplifiers to an antenna. However, in an adapter for existing monaural radio stations it is usually convenient and more economical to employ the existing monaural station equipment to amplify this signal. As shown in FIG. 6 this may be accomplished by envelope detecting the amplitude modulation component of the signal from mixer 166 and then supplying the output of envelope detector 168 to amplitude modulator 18 which modulates the signal supplied thereto in accordance with the changes in amplitude of the signal at the output of mixer 166. The variable phase signal from mixer 166 is supplied through delay device 172, limiter 14 and amplifier 16 to the input of oscillator 18. As pointed out above, the function of delay device 172 is to preserve the proper relative phases of phase modulation component and the amplitude modulation component which travel through different channels from mixer 166 to modulator 18.

It will be seen that the signal at the output of modulator 18 corresponds to the signal at the output of mixer 166 but is at a much higher power level. The power level is further increased by amplifier 24 which supplies its output signal to antenna 26.

Monaural transmission from the portion of the signal below line 10 can be accomplished by connecting oscillator 12 directly to the input of limiter 14 and by supplying a monaural signal, such as the signal at the output of adder 70, directly to the input 20 of modulator 18.

In some instances it may be desirable to connect envelope detector 168 to the output of adder 162 rather than to the output of mixer 166. If connected in this manner the carrier frequency of the signal supplied to detector 168 will remain the same for all radio transmitters regardless of assigned carrier frequencies of these transmitters.

It is also possible to modify the system of FIG. 6 by substituting the portion of the system between matrix 34 and adder 138 of FIG. 5 for the portion of the system between matrix 34 and adder 162 of FIG. 6. Mixer 154 of FIG. 6 would take the place of oscillator 134 of FIG. 5.

The insertion of the carrier wave in adder 162 through attenuator 164 minimizes the possibility of a loss of the carrier wave input in amplifier 16 owing to overmodulation in modulators 150 and 152. The amplifiers may be further protected from loss of the carrier wave by inserting a carrier wave at very low amplitude from oscillator 12 to the input of limiter 14. Since loss of the carrier wave can occur only when the A and B signals are equal, it occurs when the phase modulation of the carrier wave is zero. Thus the inserted carrier wave component may be phased so that it is in phase with the average carrier component supplied to limiter 14.

The invention has been described in terms of an oscillator 12 of constant phase together with means for shifting the phase of the carrier wave derived from this oscillator. It is within the scope of the present invention to provide means responsive to the output signal of adder circuit 86 of FIGS. 1 and 3, limiter 142 of FIG. 5 or mixer 166 of FIG. 6 for controlling directly the phase of the carrier wave generated by oscillator 12.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In a stereophonic signal transmission system, apparatus for modulating two different stereophonic information signals on a single carrier wave, said apparatus comprising a source of first and second stereophonic information signals, first means for deriving from said first and second information signals a signal having a component representative of the sum of said information signals, second means for deriving from said first and second information signals a signal having a component representative of the difference of said two information signals and a second component which is an exponential function of at least one of said information signals, a source of a carrier wave, said source including signal responsive phase modulating means for controlling the phase of the carrier wave supplied by said source, means coupling said second means to said source thereby to cause said carrier wave supplied by said source to be modulated in phase in accordance with variations in the amplitude of the signal supplied by said second means, and amplitude modulation means coupled to said first means and to said source for modulating in amplitude in accordance with the amplitude of the signal supplied by said first means the phase modulated carrier wave supplied by said source.

2. In a stereophonic signal transmission system, apparatus for modulating two different stereophonic information signals on a single carrier wave, said apparatus comprising a source of first and second stereophonic information signals, first means for deriving from said first and second stereophonic information signals a signal having a component representative of the sum of said stereophonic information signals, second means for deriving from said first and second information signals a signal having a first component representative of the difference of said two stereophonic information signals, a second component which is an exponential function of one of said stereophonic information signals and a third component which is an exponential function of the other of said stereophonic information signals, a source of a carrier wave, said source including signal responsive phase modulating means for controlling the phase of the carrier wave appearing at a first output of said source, means coupling said second means to a control input of said source thereby to cause the phase of said carrier wave at said first output to be modulated in accordance with the amplitude of the signal supplied by said second means, and amplitude modulation means coupled to said first means and to said first output of said source for modulating in amplitude in accordance with the amplitude of the signal supplied by said first means the phase modulated carrier wave appearing at said first output of said source.

3. In a stereophonic signal transmission system, apparatus for modulating wto different stereophonic information signals on a single carrier wave, said apparatus for modulating two different stereophonic inphonic information signals, first means for deriving from said first and second information signals a signal having a component representative of the sum of said information signals, second means for deriving from said first and second information signals a signal the amplitude of which is represented by the expression $$C_1(A'-B')-C_2(A')^2+C_3(B')^2$$

where A′ and B′ represent the amplitudes of said first and second information signals, respectively, and $C_1$, $C_2$ and $C_3$ are constants having values of approximately ½, approximately ¼ and approximately ¼, respectively, a carrier wave source for providing a carrier wave of preselected frequency at a first output thereof, said carrier wave having an instantaneous phase determined by the instantaneous amplitude of a signal supplied to a phase control input of said source, means coupling the output of said second means to said phase control input of said source, and amplitude modulation means coupled to said first output of said source and to said first means, said amplitude modulation means providing an output signal which is representative of the output signal of said source modulated in amplitude in accordance with the amplitude of the signal supplied by said first means.

4. A stereophonic transmission system as in claim 3 wherein said carrier wave source includes means for limiting the amplitude of the output signal thereof to a predetermined value and wherein said first means provides a signal which is represented by the expression $$K_1(A'+B')+K_2(A'-B')^2$$

where $K_1$ and $K_2$ are constants having the values of approximately ½ and approximately ¼ to ⅛, respectively.

5. In a stereophonic signal transmission system apparatus for modulating two different stereophonic information signals on a single carrier wave, said apparatus comprising a source of first and second stereophonic information signals, signal subtracting means, first signal squaring means, second signal squaring means, means for supplying said first stereophonic information signal to said subtracting means and said first signal squaring means and said second stereophonic information signal to said subtracting means and said second signal squaring means, signal combining means for linearly combining the output signals of said signal subtracting means and said first and said second signal squaring means, a source of a carrier wave, an amplitude modulator, signal responsive phase shifting means coupling said source of carrier wave to said amplitude modulator, means for supplying the output of said signal combining means to said signal responsive phase shifting means thereby to control the phase of the carrier wave supplied to said amplitude modulator, signal adder means, means for supplying said first and second information signals to first and second inputs of said signal adder means and means for supplying the output signal of said signal adder means to said amplitude modulator to modulate in amplitude in accordance with the amplitude of the signal supplied by said signal adder means the phase modulated carrier wave supplied to said amplitude modulator.

6. In a stereophonic signal transmission system apparatus for modulating two different stereophonic information signals on a single carrier wave, said apparatus comprising a source of first and second stereophonic information signals, a first source of a carrier wave, first amplitude modulator means, means for supplying said first information signal and said carrier wave at a first phase to said first amplitude modulator to modulate said carrier wave at said first phase with said first information signal, second amplitude modulator means, means for supplying said second information signal and said carrier wave at a phase in quadrature with said first phase to said second amplitude modulator means to modulate said carrier wave at said quadrature phase with said second information signal, adder means for additively combining the modulated carrier wave output signals of said first and second amplitude modulator means, means for detecting the amplitude modulation present on said signal from said adder means, a second source of a carrier wave, a third amplitude modulator having a carrier wave input and a modulating signal input, phase shifter means coupling said second source of carrier wave to said carrier wave input of said third amplitude modulator, means responsive to the signal from said adder means providing a signal representative of the phase modulation of the signal from said adder means, means coupling the output of said last-mentioned means to said phase shifter means to control the phase shift of the carrier wave passing therethrough, means coupling the output of said amplitude detector means to said modulating signal input of said third amplitude modulator means.

7. In a stereophonic signal transmission system apparatus for modulating two different stereophonic information signals on a single carrier wave, said apparatus comprising a first source of first and second stereophonic information signals, first and second amplitude modulator means each having a carrier wave input and a modulating signal input, at least one of said modulator means being a suppressed carrier modulator means, a second source for providing a first carrier wave at a selected carrier frequency, a third source for providing a second carrier wave at a frequency differing from said selected carrier frequency by a preselected, substantially constant frequency, first heterodyne means responsive to said carrier waves from said second and third sources for providing a heterodyne wave at a frequency differing from the frequencies of the waves supplied by said second and third sources, means for supplying the heterodyne wave from said first heterodyne means to the carrier wave input of said first amplitude modulator means in a first phase and to the carrier wave input of said second amplitude modulator means in a quadrature phase, means for supplying a signal representative of the sum of the stereophonic information signals from said first source to said modulating signal input of said first modulator means, means for supplying a signal representative of the difference of said stereophonic information signals from said first source to the modulating signal input of said second modulator means, adder means for additively combining the output signals of said first and second modulator means, second heterodyne mixer means responsive to the outputs of said adder means and said third signal source for providing a heterodyne signal having an average frequency equal to the frequency of the signal supplied by said second source, third amplitude modulator means having a carrier wave input and a modulating signal input, means including a signal amplitude limiter coupling the output of said second heterodyne mixer to said carrier wave input of said third amplitude modulator means, and means including an envelope detector coupling the output of said second heterodyne mixer means to said modulating signal input of said third amplitude modulator.

8. A system for adapting a monaural amplitude modulation radio transmitter operating on an assigned carrier frequency for stereophonic transmission, said system comprising first and second sources of stereophonic information signals, first and second amplitude modulator means each having a carrier wave input and a modulating signal input, at least one of said modulator means being a suppressed carrier modulator means, a third source for providing a carrier wave at a frequency differing from said assigned carrier frequency by a preselected, substantially constant frequency, first heterodyne means responsive to said carrier wave from said third source and provided with an input to which a carrier wave derived from said monaural amplitude modulated transmitter may be supplied, said first heterodyne means providing a heterodyne wave at a frequency differing from the frequencies of the waves supplied thereto, means for supplying the output wave of said first heterodyne means to the carrier wave input of said first modulator means in a first phase and to the carrier wave input of said second modulator means in a quadrature phase, means for supplying a signal representative of the sum of the signals from said first and second sources to the modulating signal input of said first modulator means, means for supplying a signal representative of the difference of said stereophonic information signals supplied by said first and second sources to the modulating signal input to said second modulator means, adder means for additively combining the output signals of said first and second modulator means, second heterodyne mixer means responsive to the output of said adder means and said third source for providing a heterodyne output signal having an average frequency equal to said assigned carrier frequency, means for deriving from said second heterodyne mixer means a signal representative of the phase modulation of the signal at the output of said second heterodyne mixer means, means including an envelope detector coupled to the output of said second heterodyne means for providing a signal representative of the amplitude modulation present on the signal at the output of said second heterodyne mixer means, and means for supplying the output signals of said two last-mentioned means to said monaural amplitude modulation transmitter to control the operation thereof.

9. A system in accordance with claim 8 wherein said first and second amplitude modulator means are both suppressed carrier modulator means, said system further comprising means coupling the output of said first heterodyne means to an input of said adder means.

10. A system in accordance with claim 9 wherein said last-mentioned coupling means includes an adjustable signal ratio device.

11. In a stereophonic signal transmission system, apparatus for modulating two different stereophonic information signals on a single carrier wave, said apparatus comprising a source of first and second stereophonic signals, signal subtracting means, first signal squaring means, second signal squaring means, means for supplying said first stereophonic information signal to said subtracting means and said first signal squaring means, means for supplying said second stereophonic information signal to said subtracting means and said second squaring means, signal inverter means coupled to the output of said second signal squaring means, first signal adder means coupled to the output of said signal subtracting means, said first signal squaring means and said signal inverting means for linearly adding the output signals of said three last-mentioned means, a source of a carrier wave, an amplitude modulator, signal responsive phase shifting means coupling said source of carrier wave to said amplitude modulator, means for supplying the output of said first signal adder means to said signal responsive phase shifting means thereby to control the phase of carrier wave supplied to said amplitude modulator, second signal adder means having first and second inputs, means for supplying said first and second information signals to said first and second inputs, respectively, of said second signal adder means and means for supplying the output signal of said second signal adder means to said amplitude modulator to modulate in amplitude in accordance with the amplitude of the signal supplied by said signal adder means the phase modulated carrier wave supplied to said amplitude modulator.

12. In a stereophonic signal transmission system, apparatus for modulating two different stereophonic signals on a single carrier wave, said apparatus comprising a source of first and second stereophonic information signals, signal subtracting means, first signal squaring means, second signal squaring means, means for supplying said first stereophonic information signal to said subtracting means and said first signal squaring means, means for supplying said second stereophonic information signal to said subtracting means and said second signal squaring means, signal inverter means coupled to the output of said second signal squaring means, first signal adder means coupled to the outputs of said subtracting means, said first signal squaring means and said signal inverter means for linearly adding the output signals of said three last-mentioned means, a source of a carrier wave, a signal limiter, signal responsive phase shifting means coupling said source of carrier wave to said signal limiter, an amplitude modulator, means for supplying the output of said signal limiter to the carrier wave input of said amplitude modulator, means coupling the output of said first signal adder means to said signal responsive phase shifting means thereby to control the phase of the carrier wave supplied to said amplitude modulator by way of said signal limiter, third signal squaring means coupled to the output of said subtracting means, second signal adder means, means for supplying said first and second stereophonic information signals and the output of said third signal squaring means to first, second and third inputs of said second signal adder means, and means for supplying the output signal of said second signal adder means to said amplitude modulator to modulate in amplitude in accordance with the amplitude of the signal supplied by said second signal adder means, the phase modulated carrier wave supplied to said amplitude modulator.

13. Apparatus for adapting a monaural amplitude modulation transmitter which includes an amplitude modulation means for the stereophonic transmission of information signals over a single channel, said apparatus comprising a source of first and second stereophonic information signals, signal subtracting means, first signal squaring means, second signal squaring means, a signal inverter coupled to the output of said second signal squaring means, means for supplying said first stereophonic information signal to said subtracting means and said first signal squaring means, means for supplying said second stereophonic information signal to said subtracting means and said second signal squaring means, first signal adder means for linearly adding the output signal of said signal subtracting means and said first signal squaring means and said signal inverter, second signal adder means, means for supplying said first and second information signals to first and second inputs of said second signal adder means, signal responsive phase shifter means, means coupling the output of said first signal adder means to said phase shifter means for controlling the phase shift provided thereby, and means coupling the output of said second signal adder means to the amplitude modulation means of said transmitter.

References Cited in the file of this patent

UNITED STATES PATENTS

| | | |
|---|---|---|
| 2,698,379 | Boelens et al. | Dec. 28, 1954 |
| 2,831,916 | Dome | Apr. 22, 1958 |
| 2,907,820 | Teer | Oct. 6, 1959 |
| 2,907,830 | Bontry et al. | Oct. 6, 1959 |